3,577,426
4-(4-TETRAHYDROPYRANYL)PYRIDINES

Charles K. McGill and George W. Campbell, Jr., Indianapolis, Ind., assignors to Reilly Tar & Chemical Corporation, Indianapolis, Ind.
No Drawing. Filed Jan. 31, 1969, Ser. No. 795,714
Int. Cl. C07d 31/30
U.S. Cl. 260—297    10 Claims

ABSTRACT OF THE DISCLOSURE 4-(tetrahydropyranyl)pyridines having the formula:

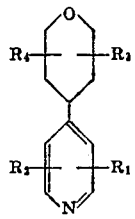

in which $R_1$ and $R_2$ represent hydrogen or lower alkyl; $R_3$ and $R_4$ represent hydrogen, lower alkyl, or phenyl; they may be alike or they may be different. In general the tetrahydropyranylpyridines are made by the dehydration of a pyridyl pentanediol.

---

Our present invention relates to a new composition of matter. More specifically it relates to 4-(4-tetrahydropyranyl)pyridines having the general formula

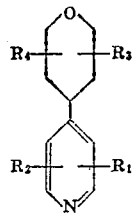

wherein $R_1$ and $R_2$ represent hydrogen or lower alkyl groups; $R_3$ and $R_4$ represent hydrogen, lower alkyl, or phenyl; they may be alike or they may be different.

The tetrahydropyranylpyridines which are the subject of our invention may be prepared by the thermal dehydration of a 3-(4-pyridyl)-1,5-pentanediol. The equation below portrays the formation of 4-(4-tetrahydropyranl)pyridine by the dehydration of 3-(4-pyridyl)-1,5-pentanediol:

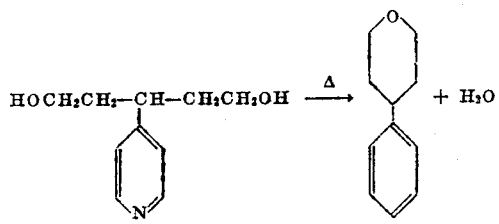

Usually we use a catalyst to assist in the formation of the tetrahydropyranylpyridine; among the more useful catalysts we find ammonium chloride, hydrochloric acid, p-toluene sulfonyl chloride, sodium hydroxide, and the like.

Some of our tetrahydropyranylpyridines may be prepared by the interaction of a 4-methylpyridine with dichloro ether.

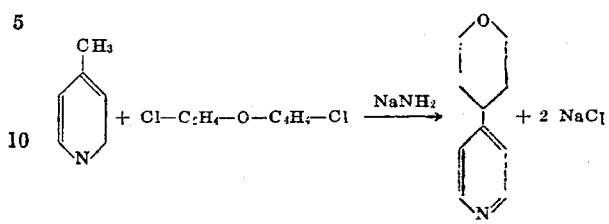

Our tetrahydropyranylpyridines have many uses. They are useful as epoxy curing agents. They are also useful in the manufacture of acid pickling inhibitors. Poly-chloro derivatives of our tetrahydropyranylpyridines possess herbicidal properties. Quaternary compounds made from our tetrahydropyranylpyridines have fungicidal, bacterial, as well as herbicidal properties. And they are useful intermediates in organic syntheses.

The pyridylpentanediols used to make our tetrahydropyranylpyridines may be made in accordance wth the procedure described in U.S. Pat. No. 2,759,946 issued Aug. 21, 1956.

Illustrative of the manner in which our tetrahydropyranylpyridines may be made we cite the following examples. The examples are by way of illustration only and are not to be construed as a limitation upon our invention.

EXAMPLE 1

4-(4-tetrahydropyranyl)pyridine

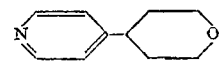

A mixture of 727 grams (4 mols) of 3-(4-pyridyl)-1,5-pentanediol and 1.5 grams of ammonium chloride is placed into a one liter three-neck flask equipped with a stirrer, thermometer, and a Dean Stark trap. The mixture is heated, with stirring, to a temperature of from about 275° C. to about 290° C. It is maintained at this temperature for from about 10 hours to about 15 hours. During the heating period a reaction occurs whereby one molecule of water is eliminated from the pentanediol, and the tetrahydropyran ring is formed. The water formed is collected in the Dean-Stark trap and when about four mols of the water are collected, the heating is discontinued, and the stirring is stopped.

The reaction mixture is now transferred to a distillation apparatus and is distilled under reduced pressure to yield from about 350 to about 500 grams of 4-(4-tetrahydropyranyl)pyridine. The tetrahydropyranylpyridine as recovered by fractional distillation is pure enough for most purposes; it has a freezing point of about 69° C. If a purer compound is desired, the distillation product may be recrystallized from any of a number of solvents; cyclohexane is one of the preferred solvents.

4-(4-tetrahydropyranyl)pyridine is a white crystalline solid. It has a freezing point of about 72.8° C. Its boiling point is about 282° C. It is soluble in water as well as such common organic solvents as methanol, isopropanol, benzene, acetone, and the like.

EXAMPLE 2

4-(4-tetrahydropyranyl)pyridine

A solution of one mol of bis[2-chloroethyl]ether in 500 cc. of liquid ammonia is prepared. To this solution there is added within a 15 minute period, a solution composed of one mol of sodio-4-picoline in 700 cc. of liquid ammonia. After the addition has been completed, the reaction mixture is stirred for about 30 minutes. Then there is added a slurry of one mol of sodamide in 500 cc. of liquid ammonia. The reaction mixture is stirred for about five hours, after which time 400 cc. of isopropanol is added. The ammonia is allowed to evaporate. The remaining mixture is filtered to remove the sodium chloride formed during the reaction.

The 4-(4-tetrahydropyranyl)pyridine formed is recovered from the filtrate by fractional distillation under vacuum.

EXAMPLE 3

4-(4-2-methyltetrahydropyranyl)pyridine

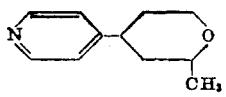

The procedure of Example 1 is repeated with the exception that 160 grams of 4-(1,5-dihydroxy-3-hexyl)pyridine (prepared by the interaction of 4-propanolpyridine and propylene oxide) is used in place of the 727 grams of 3-(4-pyridyl)-1,5-pentanediol. The product of the reaction is 4-(4-2-methyltetrahydropyranyl)pyridine which boils at about 156° at 17 mm. Hg pressure.

EXAMPLE 4

3-methyl-4-(4-tetrahydropyranyl)pyridine

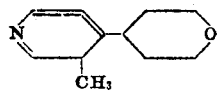

The procedure of Example 1 is repeated with the exception that 119 grams of 4-(1,5-dihydroxy-3-pentyl)-3-methyl pyridine (prepared from 3,4-lutidine and ethylene oxide) is used in place of the 727 grams of 3-(4-pyridyl)-1,5-pentanediol. The product of the reaction is 4-(4-tetrahydropyranyl)-3-methylpyridine which has a freezing point of about 83.6° C.; it possesses a camphor-like odor.

EXAMPLE 5

4-(4-2-phenyltetrahydropyranyl)pyridine

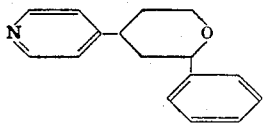

The procedure of Example 1 is repeated with the exception that 144 grams of 4-(1,5-dihydroxy-1-phenyl-3-pentyl pyridine, made by the interaction of 4-propanolpyridine and styrene oxide, are used in place of the 727 grams of 3-(4-pyridyl)-1,5-pentanediol. The 4-(4-2-phenyltetrahydropyranyl)pyridine has a boiling point of about 163° C. at 0.5 mm. Hg pressure.

EXAMPLE 6

2,6-dimethyl-4-(4-tetrahydropyranyl)pyridine

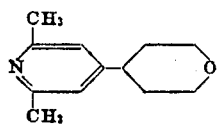

The procedure of Example 1 is repeated with the exception that 176 grams of 2,6-dimethyl-4-(1,5-dihydroxy-3-pentyl-pyridine is used in place of the 727 grams of 3-(4-pyridyl) - 1,5 - pentanediol. The 2,6 - dimethyl-4-(4-tetrahydropyranyl)pyridine has a boiling point of about 170° C. at 20 mm. Hg pressure.

EXAMPLE 7

4-(4-2,6-dimethyltetrahydropyranyl)pyridine

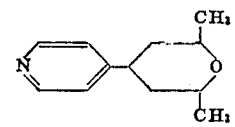

A solution of 209 grams of 4-(4-pyridyl)-2,6-heptanediol in 750 cc. of concentrated hydrochloric acid is heated under reflux conditions for about 16 hours. After the reflux period, the solution is cooled and 50% aqueous caustic soda is added to make the reaction mixture alkaline. As the reaction became alkaline two layers are formed, an aqueous layer and an organic layer. The organic layer is extracted from the mixture with methylene chloride. The 4-(4-2,6-dimethyltetrahydropyranyl)pyridine formed is recovered from the methylene chloride solution by fractional distillation under vacuum. The 4-(4-2,6-dimethyltetrahydropyranyl)pyridine distills over at 92°–96° C. at 0.4 mm. Hg pressure.

EXAMPLE 8

4-(4-2-ethyltetrahydropyranyl)pyridine

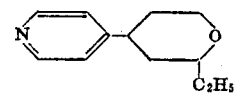

The procedure of Example 1 is repeated with the exception that 186 grams of 4-(1,5-dihydroxy-3-heptyl)pyridine (prepared by the interaction of 4-propanolpyridine and butylene oxide) is used in place of the 727 grams of 3-(4-pyridyl)-1,5-pentanediol. The 4-(4-2-ethyltetrahydropyranyl)pyridine has a boiling point of about 168° at 19 mm. Hg pressure.

EXAMPLE 9

4-(4-4-methyltetrahydropyranyl)pyridine

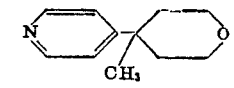

The procedure of Example 1 is repeated with the exception that 107 grams of 4-(1,5-dihydroxy-3-methyl-3-pentyl)pyridine (prepared by the interaction of 4-ethylpyridine and ethylene oxide) is used in place of the 3-(4-pyridyl) - 1,5 - pentanediol. The 4-(4-4-methyltetrahydropyranyl)pyridine has a boiling point of about 129° C. at 2.5 mm. Hg pressure.

EXAMPLE 10

2-methyl-4-(4-tetrahydropyranyl)pyridine

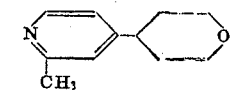

The procedure of Example 1 is repeated with the exception that 82 grams of 2-methyl-4-(1,5-dihydroxy-3-pentyl)pyridine is used in place of the 727 grams of 3-(4-pyridyl)-1,5-pentanediol. The 2 - methyl-4-(4-tetrahydropyranyl)pyridine boils at about 162° C. at 21 mm. Hg pressure.

The chemical behavior of our new compounds is typical of pyridine ring containing compounds within the limitations imposed by the presence of the tetrahydropyran nucleus. They react with alkyl halides to form quaternary pyridinium compounds. Oxidation with hydrogen peroxide gives the corresponding —N-oxide. Catalytic hydrogenation under pressure gives the corresponding tetrahydropyranylpiperidine.

Our tetrahydropropyranylpyridines are useful curing agents for epoxy resins. A mixture of 91 grams of an epoxy resin, Epi Rez 510 (made by Devoe & Reynolds) and 10 grams of 4-(4-tetrahydropyranyl)pyridine when heated at 80° C. for about two hours becomes cured. The hardened resin has a smooth, blush-free surface that is mar resistant.

Quaternary compounds made from our tetrahydropyranyl pyridines are useful in retarding the action by mineral acids upon steel. A particularly useful acid inhibitor is the quaternary made from stearyl chloride and 4-(4-tetrahydropyranyl)pyridine. Adding only 0.05 gram of this quaternary to 1500 cc. of 6% aqueous $H_2SO_4$ inhibits the attack of the acid at 80° C. to the extent of 98.6%.

We claim as our invention:

1. 4-(4-tetrahydropyranyl) pyridines having the structural formula

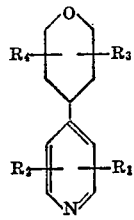

wherein $R_1$ and $R_2$ are selected from the group consisting of hydrogen and lower alkyl, and $R_3$ and $R_4$ are selected form the group consisting of hydrogen, phenyl, and lower alkyl.

2. 4-(4-tetrahydropyranyl)pyridine.
3. 2-methyl-4-(4-tetrahydropyranyl)pyridine.
4. 3-methyl-4-(4-tetrahydropyranyl)pyridine.
5. 2,6-dimethyl-4-(4-tetrahydropyranyl)pyridine.

6. The process of preparing the 4-(4-tetrahydropyranyl)pyridines of claim 1 which comprises thermally dedrating a 3 - (4-pyridyl)-1,5-pentanediol and recovering the resulting 4-(4-tetrahydropyranyl)pyridine.

7. The process of preparing 4-(4-tetrahydropyranyl)pyridine which comprises thermally dehydrating 3-(4-pyridyl)-1,5-pentanediol and recovering the resulting 4-(4-tetrahydropyranyl)pyridine.

8. The process of preparing 2-methyl-4-(4-tetrahydropyranyl)pyridine which comprises thermally dehydrating 2-methyl-4(1,5-dihydroxypentyl)pyridine and recovering the resulting 2 - methyl-4-(4-tetrahydropyranyl)pyridine.

9. The process of preparing 3-methyl-4-(4-tetrahydropyranyl)pyridine which comprises thermally dehydrating 3-methyl-4(1,5-dihydroxypentyl)pyridine and recovering the resulting 3 - methyl-4-(4-tetrahydropyranyl)pyridine.

10. The process of preparing 2,6-dimethyl-4-(4-tetrahydropyranyl)pyridine which comprises thermally dehydrating 2,6-dimethyl-4-(1,5-dihydroxy - 3 - pentyl)pyridine and recovering the resulting 2,6-dimethyl-4-(4-tetrahydropyranyl)pyridine.

References Cited

Sugimoto et al., Chem. Abstracts, vol. 52, page 1277, 1958.

ALAN L. ROTMAN, Primary Examiner

U.S. Cl. X.R.

260—2, 47, 999; 252—148

Notice of Adverse Decision in Interference

In Interference No. 99,001, involving Patent No. 3,577,426, C. K. McGill and G. W. Campbell, Jr., 4-(4-TETRAHYDROPYRANYL)PYRIDINES, final judgment adverse to the patentees was rendered Nov. 18, 1976, as to claim 2.

[*Official Gazette March 22, 1977.*]